United States Patent [19]

Reuchlein

[11] Patent Number: 4,824,149
[45] Date of Patent: Apr. 25, 1989

[54] GENERATOR SET

[75] Inventor: Günter Reuchlein, Augsburg, Fed. Rep. of Germany

[73] Assignee: MAN Technologie GmbH, Fed. Rep. of Germany

[21] Appl. No.: 167,342

[22] Filed: Mar. 14, 1988

[30] Foreign Application Priority Data

Mar. 20, 1987 [DE] Fed. Rep. of Germany ....... 3709266

[51] Int. Cl.$^4$ .............................................. F02G 1/04
[52] U.S. Cl. ...................................... 290/1 R; 60/518
[58] Field of Search .................... 290/1 R, 1 A, 2; 60/518, 519, 520, 521, 525; 310/15

[56] References Cited

U.S. PATENT DOCUMENTS

| | | | |
|---|---|---|---|
| 3,999,388 | 12/1976 | Nystrom | 290/2 X |
| 4,327,550 | 5/1982 | Knoos | 60/521 X |
| 4,511,805 | 4/1985 | Boy-Marcotte et al. | 290/2 |
| 4,631,922 | 12/1986 | Kleinwachter et al. | 60/518 |
| 4,642,988 | 2/1987 | Benson | 60/518 |
| 4,649,283 | 3/1987 | Berchowitz et al. | 290/1 R |

FOREIGN PATENT DOCUMENTS

| | | |
|---|---|---|
| 0070780 | 1/1983 | European Pat. Off. |
| 2402289 | 7/1975 | Fed. Rep. of Germany |
| 3341105 | 5/1985 | Fed. Rep. of Germany |

Primary Examiner—William M. Shoop Jr.
Assistant Examiner—W. E. Duncanson Jr.
Attorney, Agent, or Firm—Scully, Scott, Murphy & Presser

[57] ABSTRACT

The aim of the invention is to improve upon conventional electricity generator sets consisting of a driven generator with relatively complex couplings and possibly a gear box transmission between the crank shaft and the generator.

In accordance with the invention the engine is a stirling or hot gas engine with at least four double acting cylinders, each of whose pistons placed between a hot and a cold cycle space is connected with a piston rod on a cross head linearly guided in a cross head guide and coupled via coupling member, more especially one in the form of a connecting rod, with a crank shaft. Furthermore the moving elements—permanent magnets or exciting windings—of a linear generator are located in each cross head and the stationary parts—stators—are arranged on the associated cross head guide. The crank shaft and linking members only serve to synchronize the working cycles of the engine and are therefore only designed for light duty. Furthermore the crank shaft is entirely comprised within the crank shaft housing and the latter is hermetically sealed.

The generator set serves as a self-contained unit for the production of electricity with a comparatively high power output, such electric output being used for charging an accumulator, running a load or for supplying a distribution network.

18 Claims, 1 Drawing Sheet

GENERATOR SET

BACKGROUND OF THE INVENTION

The present invention relates to a generator set and more particularly but not exclusively to such a generator set involving a novel design of a prime mover engine in the form of a multicylinder reciprocating piston engine having elements moving linearly to and fro in guides, the stationary and moving parts of a linear generator being arranged adjacent to at least one guide.

Such a generator set has been described in the German unexamined specification No. 3,341,105 in connection with a motor vehicle. This vehicle had a drive engine with a standard structure, which primarily was designed as a source of driving power for the vehicle; that is to say it was a question of a gasoline or diesel engine with pistons moving in cylinders and each connected via a connecting rod with a crank shaft which was joined by a manual or automatic transmission with a power train for supply of the power to the wheels of the vehicle. In the case of this vehicle engine there are one or more linear generators as an alternative to a conventional dynamo for production of electricity for electrically powered equipment on the vehicle. The linear generator or generators were to be arranged adjacent to one or more gas changeover valves, that is to say the permanent magnets as the moving parts of the linear generators were placed on the valve stems and the stators were placed on the cooperating valve stem guides.

However, the drive engine of a motor vehicle is subject to considerable variations in speed of rotation and of the load, something that usually is a disadvantage as regards the production of electricity and is only able to be coped with by having an involved automatic control system. Furthermore the electricity producing device associated with this vehicle drive engine is only used for charging the vehicle battery, the dynamo which is otherwise as a rule driven via v belts from the crank shaft is replaced by the linear generator or generators. For such an application it may be quite feasible for the engine to serve both for the production of electricity and for mechanically driving the vehicle.

There are however applications in which IC engines are exclusively used for driving the generator of a generator set, as for instance in emergency power supplies. In such a case a conventional IC engine is as a rule connected via an elastic coupling and a suitable transmission with a conventional generator. For such applications stirling engines have also been used, as for instance in submarines or other ships for producing the electricity needed for operation of appliances on board and for operation of the electric motor or motors turning the propellers. In the case of such plant it is however generally the case that the transmission and automatic control systems for operation of the generator from the crank shaft are very involved and expensive.

SHORT SUMMARY OF THE INVENTION

Accordingly one object of the present invention is to devise a generating set which while being driven by a reciprocating engine as a prime mover is able to dispense with the need for involved, expensive and bulky transmission gear between the crank shaft and the generator unit.

In order to attain these or other objects, in accordance with the present invention the reciprocating piston engine is a double acting hot gas or stirling engine with at least four cylinders, whose pistons each running between a hot and cold cylinder space each have a piston rod connected to a cross head linearly running in a cross head guide and connected by means of a coupling member, more especially in the form of a connecting rod, to a crank shaft, and furthermore in each such cross head the moving parts of a linear generator—that is to say permanent magnets or exciting windings—are located while the non-moving parts of the generator—that is to say the stators—are arranged in the associated cross head guide, and the crank shaft and the coupling members only serve to synchronize the working cycles and are of a correspondingly light duty design and furthermore the crank shaft does not extend out of the crank shaft housing and the latter is hermetically sealed off.

It will thus been seen that in accordance with the present invention the generating devices are integrated directed in the intrinsic elements of a stirling or hot gas engine. For this purpose, for example in the case of a conventional stirling engine, it is only necessary to provide for slight modifications in connection with the cross heads and their guides for mounting the parts of the linear generators. These modifications are however more than compensated for by the fact that the crank shaft and the connecting rods of the design of the invention only have to be used for synchronisation of the working cycles, unlike the case of conventional stirling engine, and may thus be made with a light duty design or rating. That is to say, the crank shaft and the connecting rods may be made of a cheaper material with less load carrying capacity which all in all does not have to fulfill the high standards applicable for the material used in a conventional stirling engine. A further advantage produced by the design of the invention is due to the fact that owing to the total enclosure of the crank shaft within the crank shaft housing, the latter may be hermetically sealed off and it is possible to dispense with comparatively expensive rolling diaphragm seals or complicated sliding seals, such seals generally being absolutely necessary in conventional stirling engines in order to avoid loss of operating gas and owing to the fact that the crank shaft housing is not hermetic.

With the design in accordance with the invention with the generator elements integrated into the structure of the stirling engine it is thus possible to dispense with conventional generators placed externally of the engine and driven by a transmission and coupling from the crank shaft. Furthermore the design in accordance with the invention reduces the overall weight of the set and reduces the amount of space needed to a not insubstantial extent.

Advantageous further developments and features of the invention will be seen from the claims.

There now follows an account of the generator set in accordance with the invention with reference to the working example to be seen in the drawings.

LIST OF THE SEVERAL VIEWS OF THE DRAWINGS

ACCOUNT OF WORKING EMBODIMENT OF THE INVENTION

Figure 2:
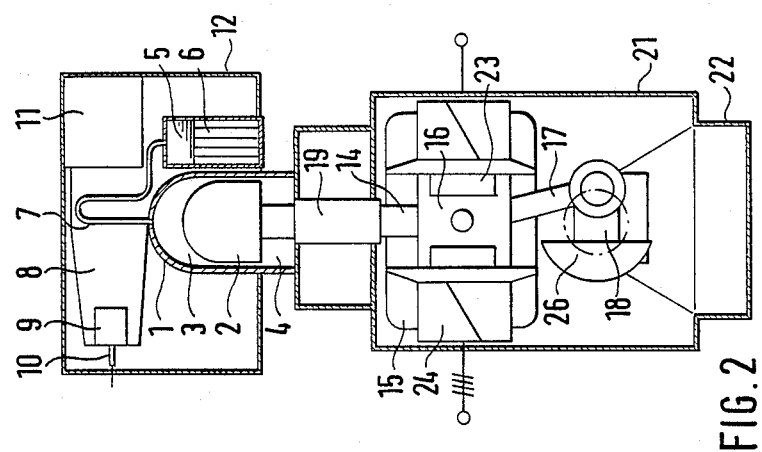
FIG. 2 is a cross section taken through the stirling engine of FIG. 1.
Figure 1:
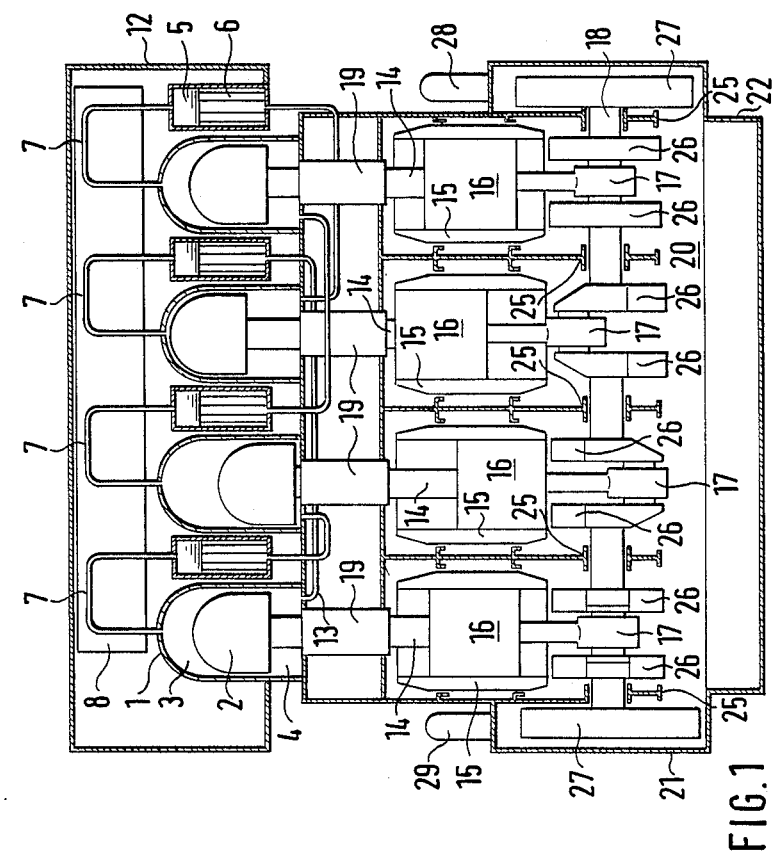
FIG. 1 is a generally schematic longitudinal section through a multicylinder, double acting stirling engine with integrated components of a generator means.

The basic component of the generator set in accordance with the invention is a four cylinder double acting hot air or stirling engine. This stirling engine may however comprise more than four cylinders, in which case it is preferred for the stirling engine to have an even number of cylinders as for instance 6, 8, or 12 cylinders. Generally, the stirling engine has a typical design for a double acting engine, whose workings are well known to those in the art.

The four cylinder double acting stirling engine shown in the drawing is such that each cylinder has a cylinder housing 1 in which the piston 2 functions and divides the housing into an upper hot cycle space 3 and a lower cold cycle space 4. Each cylinder is provided with a regenerator/cooler unit, consisting of a regenerator 5 and a cooler 6 together with a heater tube system 7. Each heater tube system 7 is connected at one end with the hot cycle space 3 and at the other with the regenerator 5 of the respective regenerator/cooler unit 5 and 6. The arrangement is such that either each heater tube system 7 is extended separately through a combustion chamber 8 or all the heater tube systems 7 are extended through it in common. Hot gases of combustion are produced in the chamber 8 by a burner 9, such gases serving for heating the operating gases located in a closed circuit. Heating may take place in some other known manner however by another source of heat with a rated temperature in excess of 800° C., as for example using solar energy or a chemical source of heat, the transfer of energy taking place directly or indirectly using the heat pipe system principle. The burner 9 is shown in the present instance as being connected with a fuel supply pipe 10 and with an air supply, which in the drawing is only shown as an air preheater 11. The air preheater 11, the combustion chamber 8 and the regenerator/cooler units 5 and 6 are accommodated within a housing 12 extending along the stirling engine and furthermore covering the cylinder housing 1. Each cold cycle space 4 is connected via a connection duct 13 with a cooler 6 of a regenerator/cooler unit 5 and 6 in accordance with the cycle sequence dependent on the design of the engine.

Each piston 2 is guided for linear motion and connected with transmission gear. That is to say each piston 2 is connected via a piston rod 14 with a cross head 16 running in a cross head guide 15 and the cross head is connected via a coupling link, in the instant case a connecting rod 17, with a crank shaft 18. Each piston rod 14 runs in a stuffing box 19, which seals off the respective cold cycle space from the drive transmission space. The latter is in a hermetically sealed crank housing 21, which serves to receive leaked operating gas. Reference 22 denotes an oil sump.

The moving parts—permanent magnets or exciting windings 23—of a linear generator are arranged in each cross head 16 and the stationary parts—stators 24—are placed on the associated cross head guide 15. In this respect the permanent magnet or magnets or the exciting windings 23 are integrated in lateral recesses in the cross heads 16. The cross head guides 15 are in the form of bushings with integrated pole shoes carrying stator windings in order to form the stators 24. The windings of the stators 24 are connected with a rectifier if this should be necessary. In the case of a six cylinder stirling engine it is however possible for the current produced by the six linear generators to be tapped as three phase current from respectively three linear generators and supplied to a load or fed into some distribution network. The current produced might as a general point be supplied to an accumulator. The load, which is not shown may for example take the form of an electric motor or another contrivance to be supplied with electric power. The linear generators may also be used to start the stirling engine, for which purpose the windings of the stators 24 are able to supplied with current a short time via a suitable starting circuit.

Since the power of the stirling engine is converted into electrical energy even at the cross heads, the crank shaft 18 and the connecting rods 17 of the stirling engine are only employed to synchronize the working cycles of the engine and are accordingly made with a light duty design owing to the small residual forces to be transmitted thereby. Furthermore, the crank shaft 18 is not extended out of the crank housing 21 and instead is bearinged within it at a number of suitable light duty bearings 25. There are furthermore counterweights 26 on the crank shaft 18 in order to balance the masses. There are also flywheel members 27 in order to even out the motion of the pistons 2.

A pressure hold valve 28 and an excess pressure valve 29 are also connected with the crank housing 21, such valves serving to let of operating gas from the crank housing 21 when the pressure of the operating gas in the housing rises or becomes excessive, such let off gas being returned via a duct (not shown) to a power controlling device (not shown) of the stirling engine.

Since the pistons 2 of the stirling engine are evenly spaced out around the periphery of the crank shaft 18 in accordance with the prescribed working cycle by way of their coupling elements, in the present case connecting rods 17, the proper phase relationship between the individual pistons is ensured for a double acting stirling engine. Furthermore the synchronizing crank shaft 18 ensures an even, almost sinusiodal motion of the alternators, that is to say of the parts 23 moved in an oscillating fashion of the linear generators and thus causes there to be the desired almost sinusional amplitude function of the electrical output data as regards current and voltage of the linear generators. Moreover the crank shaft with this design makes it possible to ensure an effective and angularly accurate balancing of the masses.

In lieu of the transmission gear geometry shown in the drawing, that is to say the connecting rod link between the cross heads and the crank shaft it possible to have another transmission gear geometry which has a smaller length, as for instance a Parson transmisson gear -of known structure or a crank shaft loop transmission gear with suitable link members.

I claim:

1. A generator set comprising at least a four cylinder double-acting hot gas or stirling engine which each piston:
   a. operates in a cylnder between a hot and a cold cylinder chamber in a reciprocating mode;
   b. is connected through a piston rod to a cross head in which cross head guidance is limitedly conducted, and
   c. that a coupling rod which is attached to the cross head is connected with a crank shaft, in which in each of the cross heads are built the moveable components of a linear generator consisting of the permanent magnets and exciting coils, and on which each cross head guidance there are arranged the stationary components of a linear generator, namely, the stators, wherein the coupling rods in the crank shaft, inasmuch as no power is to be transmitted from the crank shaft, merely permit synchronization of the operating cycles of the pistons, said coupling rods being constructed of lightweight material, and wherein the crank shaft is additionally not conducted out of the crank shaft housing which encompasses the drive mechanism chamber, said crank shaft housing being hermetically sealed.

2. A generator set as claimed in claim 1, wherein there are arranged on the crank shaft of the hot gas or stirling engine:
   a. counterweights for a weight equilibrium, and
   b. fly weights for equalizing the reciprocating movements of the piston.

3. A generator set as claimed in claim 1, wherein seal means which seal the cold cycle chambers relative to the drive mechanism chamber are constructed as simple gliding sleeve end seals cooperating with the piston rods, and any operating gas leakges due to this type of seal can be restrained through the drive mechanism chamber which is sealed by the crank shaft housing.

4. A generator set as claimed in claim 3, wherein at least one valve that is connected to the crank shaft housing, which at an excessive internal pressure in the crank shaft housing can again reconvey the encountered leakage work gas into the working gas cycle, and which is connected through a conduit with the power regulating device for the hot gas or stirling engine.

5. A generator set as claimed in claim 4, wherein said valve is a pressure holding valve.

6. A generator set as claimed in claim 4, wherein said valve is an excess pressure valve.

7. A generator set as claimed in claim 4, wherein a pressure holding valve and an excess pressure valve are arranged on said crank shaft housing.

8. A generator set as claimed in claim 1, wherein said moveable portions of a linear generator which are formed by permanent magnets or exciting coils are respectably integrated in lateral depressions in a cross head.

9. A generator set as claimed in claim 1, wherein the cross head guidances are constructed as running sleeves which are integrated in said stationary components of a linear generator which are formed by stator windings.

10. A generator set as claimed in claim 1, wherein the windings of said stators forming the stationary components of a linear generator are attached on a rectifier.

11. A generator set as claimed in claim 1, wherein in a hot gas or a stirling engine, whose number of cylinders can be divided by six and a whole number, can have the current generated by the linear generator moved as a three phase rotary current from three linear generators.

12. A generator set as claimed in claim 1, wherein said linear generators can also be employed for the starting of the hot gas or stirling engines and for this purpose windings of said stators can be supplied for a short term with current from a suitable electrical starter circuit.

13. A generator set as claimed in claim 1, wherein the heater of the hot gas or stirling engine is heated from a heat source which delivers a usable temperature of in excess of 800° C.

14. A generator set as claimed in claim 13, wherein said heat source for the heater of the hot gas or the stirling engine is a flue gas heater.

15. A generator set as claimed in claim 13, wherein said heat source for the heater of the hot gas or stirling engine is from chemical heat sources.

16. A generator set as claimed in claim 13, wherein said heat source for the heater of the hot gas or stirling engine is from solar energy.

17. A generator set as claimed in claim 13, wherein said heat source is constructed for the direct heating of the heater of the hot gas or stirling engine.

18. A generator set as claimed in claim 13, wherein said heat source is provided for the indirect heating of the heater of the hot gas and stirling engine pursuant to heat pipe principles.

* * * * *